(No Model.) 2 Sheets—Sheet 1.

G. P. VAN WYE.
SEED PLANTER AND MARKER.

No. 461,060. Patented Oct. 13, 1891.

Witnesses.
A. Ruppert.
G. B. Towles

Inventor.
Garry P. Van Wye
Per
Thomas P. Simpson
Atty (No Model.) 2 Sheets—Sheet 2.

G. P. VAN WYE.
SEED PLANTER AND MARKER.

No. 461,060. Patented Oct. 13, 1891.

Witnesses.
A. Ruppert
G. B. Towle

Inventor.
Garry P. Van Wye
Per
Thomas J. Simpson
Atty.

UNITED STATES PATENT OFFICE.

GARRY P. VAN WYE, OF WINFIELD, KANSAS.

SEED-PLANTER AND MARKER.

SPECIFICATION forming part of Letters Patent No. 461,060, dated October 13, 1891.

Application filed January 31, 1891. Serial No. 379,827. (No model.)

*To all whom it may concern:*

Be it known that I, GARRY P. VAN WYE, a citizen of the United States, residing at Winfield, in the county of Cowley and State of Kansas, have invented certain new and useful Improvements in Seed-Planters and Markers; and I do hereby declare the following to be a full, clear, and exact description of the invention, such as will enable others skilled in the art to which it appertains to make and use the same.

This invention consists in certain improvements in planters which are provided with markers, as hereinafter described and claimed.

Figure 1:
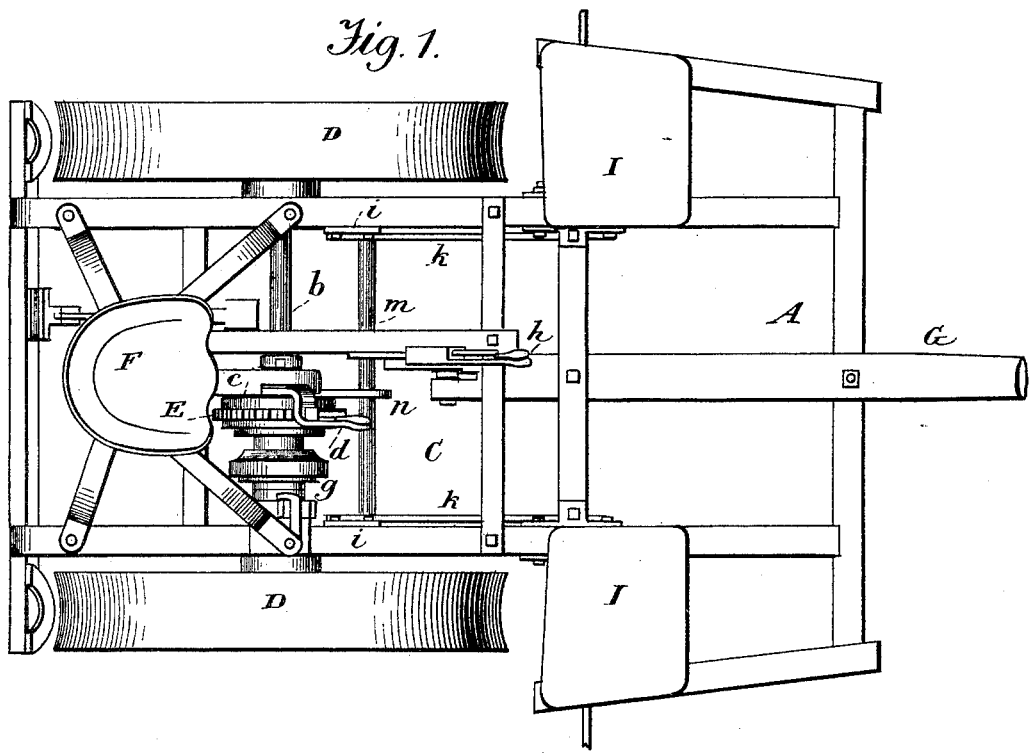
Figure 2:
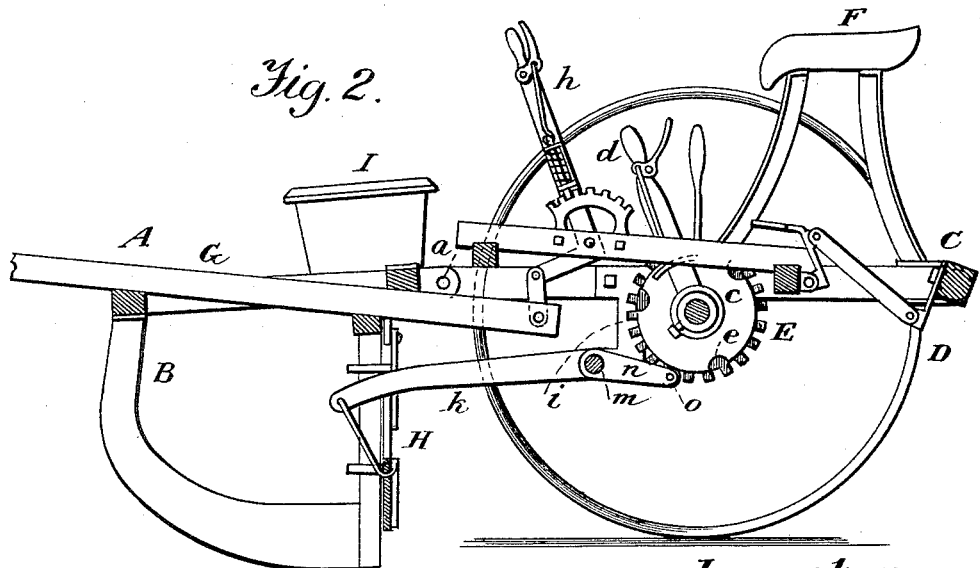
Figure 3:
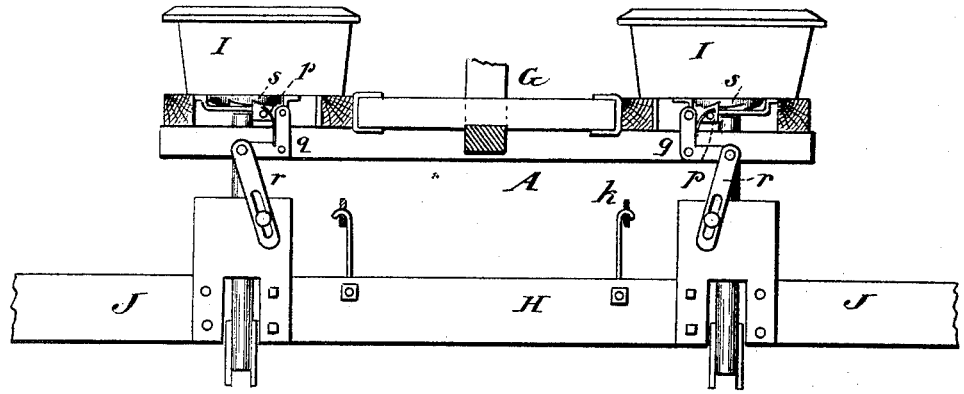
Figure 4:
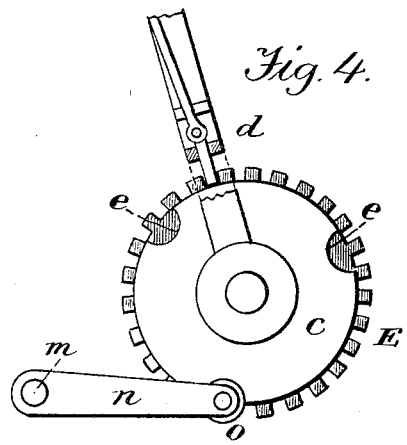
Figure 5:
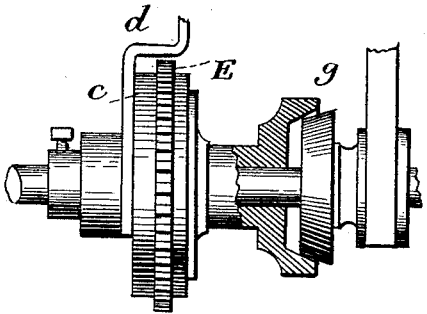
Figure 6:
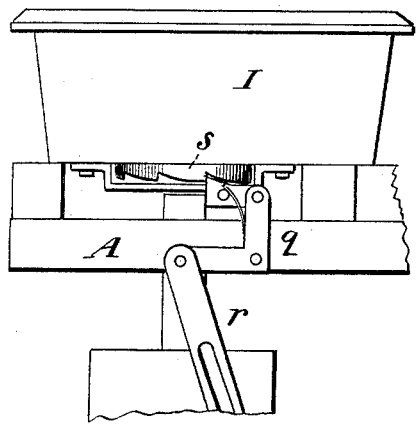

In the accompanying drawings, Figure 1 represents a plan view of a planter provided with my improvements. Fig. 2 illustrates certain parts in side view. Fig. 3 illustrates the forward part of the machine and marker in rear view. Figs. 4, 5, and 6 are detail views, more particularly described hereinafter.

A designates the forward part of the frame, which is mounted on runners B and is pivotally connected at $a$ with the main portion C of said frame, which is mounted on the wheels D, the latter being driving-wheels and provided with pawls in their hubs for connection with the axle in a manner well known.

In a central position on the axle $b$ of wheels D is mounted a wheel E, provided with teeth for connection with a lever $d$, provided with a catch and located near the driver's seat F. To one side of said wheel E is fastened or made solid therewith a circular disk $c$, which has three notches or recesses $e$ made in its periphery, said notches being equidistant from one another, as shown, for the purpose hereinafter set forth. A clutch $g$ or other suitable device is provided for putting the wheel E in or out of gear with the axle $b$.

G indicates the draft-pole, the rear end of which is connected by a pivoted elbow-lever $h$ with the frame C, said lever being adjustable on a segment-rack for regulating the frame in position.

H indicates a marking device, which is suspended from the forward ends of two arms or levers $k$, the rear ends of said levers being pivotally connected with hangers $i$, which are rigidly attached to side bars of the frame C. Near their rear ends the levers $k$ are connected by a cross-bar $m$, fastened thereto, and from said cross-bar an arm $n$ extends rearward, as shown. The arm $n$ carries a roller $o$, which is held in position against the periphery of the circular disk $c$, so that as the wheel E rotates with the axle of wheels D the roller $o$ sinks into each of the recesses $e$, and the forward ends of the arms $k$, with the marker, are correspondingly depressed every time the said roller enters one of the recesses.

I indicates the seed-boxes, which are mounted on the forward frame A, each of said boxes being provided with a dropping-disk $s$, which is provided with ratchet-teeth on its lower side at its periphery. An elbow-lever $q$ is pivoted to the frame A below each seed-box and carries a spring-pawl $p$, adapted to connect with the teeth of a disk $s$. The lever $q$ is connected by an adjustable strip or rod $r$ with the marker H. The marker is loosely connected with standards of the frame A to retain it in position and has extensions J secured to its extremities, these extensions being long enough to mark half the distance between rows. The marker descends by its own gravity every time the roller on arm $n$ enters a recess $e$ in the wheel E, and as it descends draws downward the rods $r$, which, through elbow-levers $q$, actuate the spring-pawls $p$, and the latter engage the dropping disks $s$, partially turning said disks, and thus effecting a dropping of seed.

The wheel E is shown as having three recesses $e$ in its periphery, and therefore engages the marker and actuates the seed-dropping mechanism three times during each revolution of said wheel. The driving-wheels D, making their revolution simultaneously with the wheel E, should therefore be in circumference equal to three times the distance between rows.

I claim—

The loose axle-pinion E, operated by a hand-lever $d$, carrying a disk $c$, peripherally notched at $e\ e\ e$ and adapted to be geared with or ungeared from the axle, in combination with a cross-bar $m$, having an arm $n$, with end roller $o$, bearing on the disk $c$, and the levers $k\ k$, carrying the vertically-movable markers H, as and for the purpose set forth.

In testimony whereof I have affixed my signature in presence of two witnesses.

GARRY P. VAN WYE.

Witnesses:
W. E. WHITE,
J. O. SMITH.